Aug. 11, 1931.  A. F. CALLISON  1,818,841
EQUIPMENT FOR AIRPLANE LANDING FIELDS OR TERMINALS
Filed Feb. 19, 1929  2 Sheets-Sheet 1
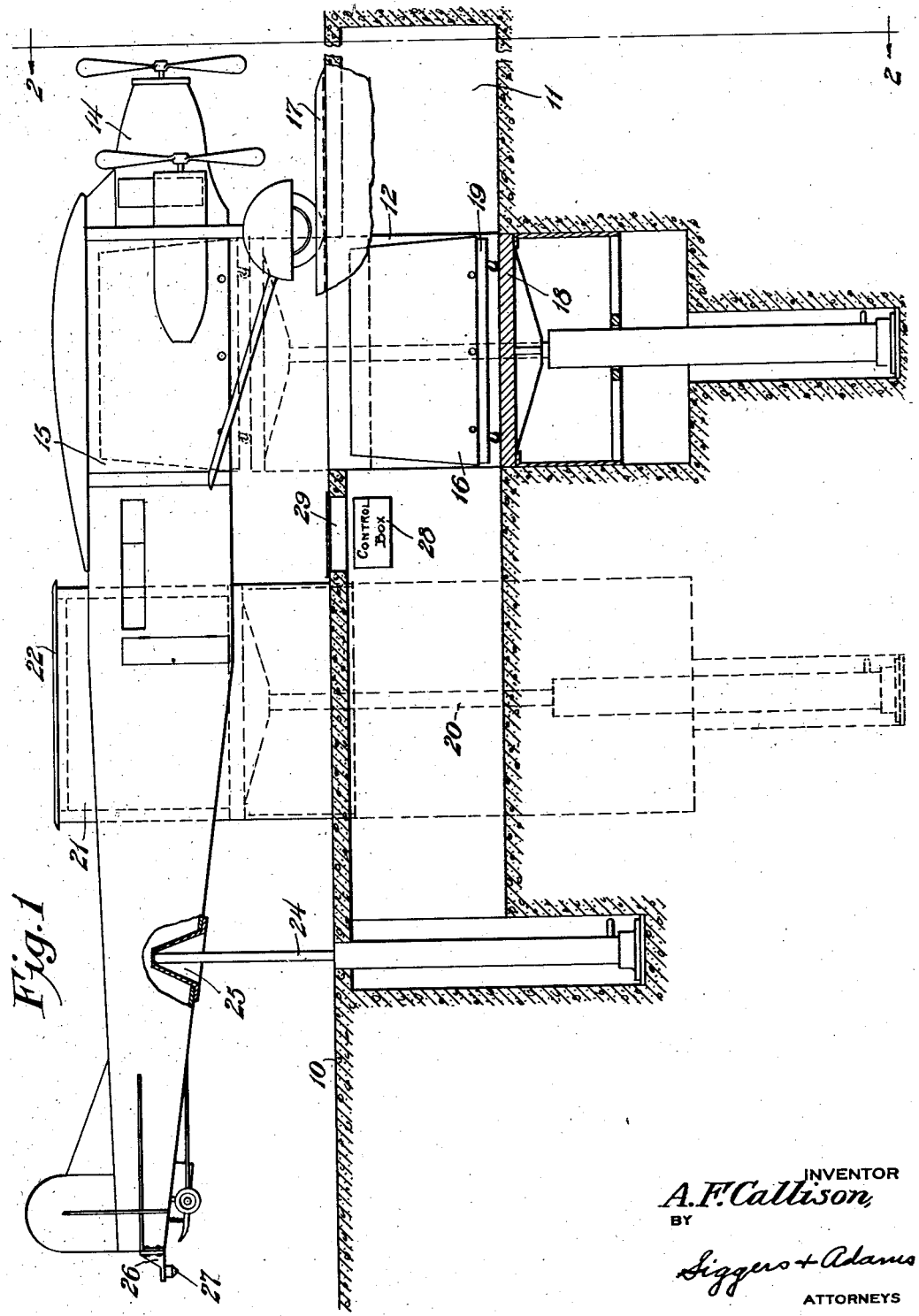
INVENTOR
A. F. Callison,
BY
Siggers + Adams
ATTORNEYS Aug. 11, 1931.  A. F. CALLISON  1,818,841
EQUIPMENT FOR AIRPLANE LANDING FIELDS OR TERMINALS
Filed Feb. 19, 1929  2 Sheets-Sheet 2
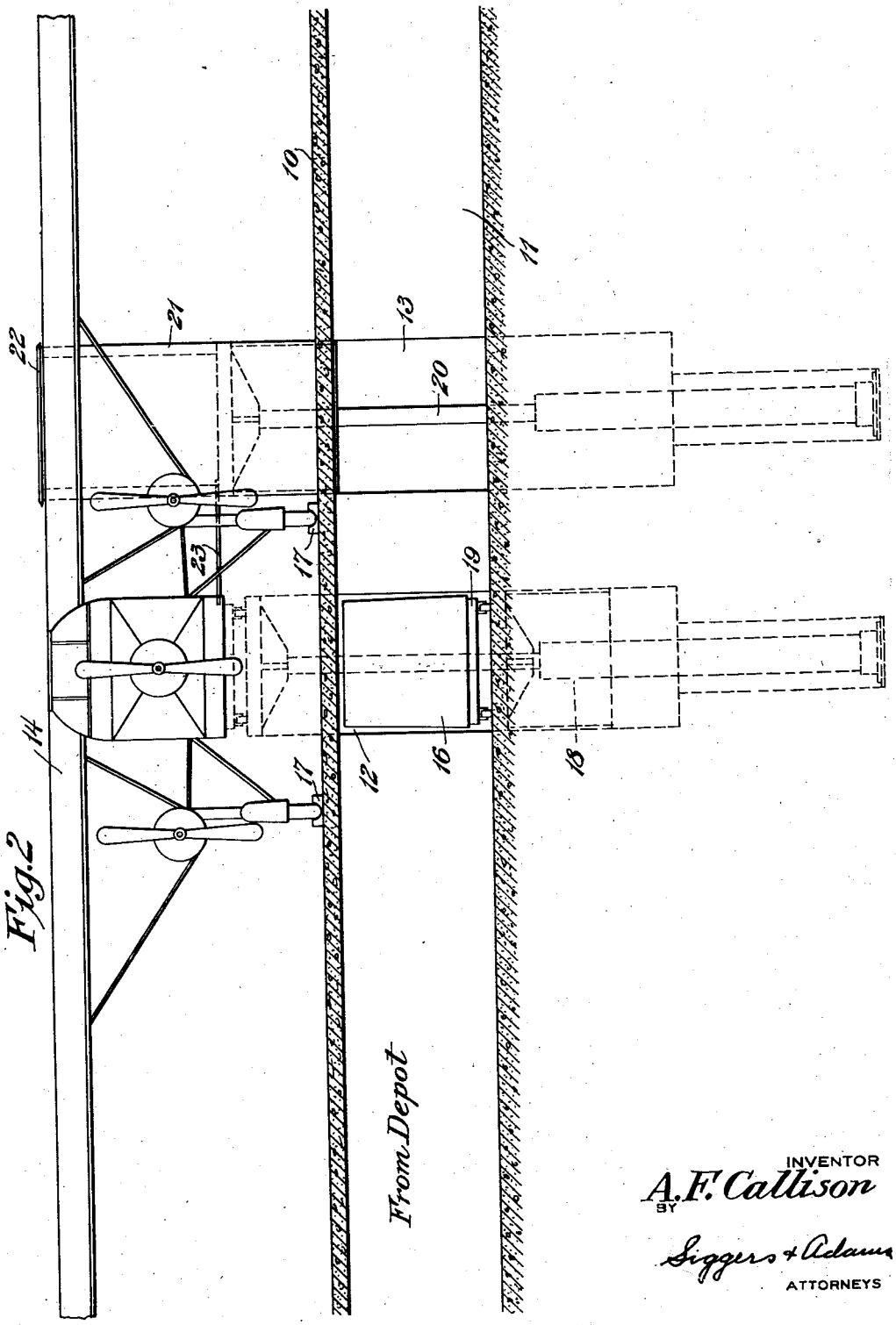
INVENTOR
A.F. Callison
BY
Siggers + Adams
ATTORNEYS Patented Aug. 11, 1931

1,818,841

UNITED STATES PATENT OFFICE

ABNER F. CALLISON, OF NEW YORK, N. Y.

EQUIPMENT FOR AIRPLANE LANDING FIELDS OR TERMINALS

Application filed February 19, 1929. Serial No. 341,064.

This invention relates to improved equipment for airplane landing fields or terminals and, among other objects, aims to provide improved loading and unloading facilities to handle incoming and outgoing passengers and cargo without conflicting with the traffic on the landing field and without danger of serious accidents.

In the accompanying drawings, wherein one practicable embodiment of the invention is shown, Fig. 1 is a fragmentary longitudinal sectional view of a typical landing field in which the equipment is installed and showing an airplane spotted in loading or unloading position; and Fig. 2 is a sectional view taken on the line 2—2 of Fig. 1.

The modern transportation demands on airplane traffic require special equipment at the landing fields to handle both cargo and passengers. Nearly all fields are now equipped with a passenger station located at one side or edge so as not to conflict with the landing space. It has been necessary for outgoing and incoming passengers to walk on the field between the station and the plane and to transfer baggage, freight, express, mail or other cargo across the landing surface. This, of course, involves a serious hazard because of possible conflict with other airplanes while they are landing and the consequent danger of accidents. It is a great desideratum that the landing field be kept clear of all extraneous traffic, especially if space is limited as is usually the case. This invention, therefore, aims to provide improved equipment expeditiously to handle both passengers and cargo without entailing any of the foregoing hazards.

Referring particularly to the drawings, there is shown a section of a landing field 10 having a main relatively wide subway or tunnel 11 leading from the depot preferably crosswise the field. This subway or tunnel is sufficiently wide to accommodate both passenger and cargo traffic to and from the planes. The length of the subway is such that two or more planes can be spotted above and across it at safe distances apart and from the depot (not shown) so as to be loaded or unloaded. It is contemplated that an outgoing plane shall be receiving its load while an incoming plane is discharging its load, thus making it desirable to have at least two stations.

Herein, the main subway 11 is shown as having lateral, branch tunnels 12 and 13, one for passengers and the other for cargo at a loading station. Two such branch tunnels are desirable for loading certain types of planes later to be described. The idea is to permit the loading or unloading operations to proceed at the station without interfering with the traffic in the main subway and also to enable the cargo and the passengers to be transferred to the fuselage of the plane.

I have shown an airplane 14 of the same general design as that shown and claimed in my copending applications, Serial No. 135,731, filed Sept. 16, 1926, and Serial No. 135,732, filed Sept. 16, 1926. Hence, no detailed description is necessary. The fuselage has a flared cargo space 15 opening through the bottom to receive special tapered containers 16 and rear compartments for clerks, mail, passengers and baggage, doors being provided on each side of the rear compartments. The plane is adapted to be spotted over the main tunnel with the cargo space above the cargo tunnel 12. For this purpose, guides 17 in the form of trough-shaped blocks are fixed on the landing surface 10 to guide the landing wheels of the plane. Further, the tail end is adapted to be lifted by suitable means, later to be described, to bring the floor on a level. Thus positioned, the passenger tunnel 13 is parallel with and at one side of the fuselage.

In the present example, there is shown a cargo elevator 18, conveniently of the hydraulic plunger type arranged within the cargo tunnel, the platform adapted to be lowered to the floor level, so that a live skid 19 carrying a container 16 can be rolled or deposited on it. The live skid has ordinary swivel wheels so that a commercial lift truck may be driven under it to carry the cargo through the tunnel 11. Also, the wheels permit it to be shifted about on the platform whereby the upper end of the container will guide itself into the cargo space 15 if it should happen to be a little out of line with it. The container is, of course, lifted and locked in its compartment before the elevator is lowered. When this elevator is not in use the platform may be elevated to cover the elevator well and preserve the continuity of the landing surface.

There is also provided an elevator 20 in the passenger tunnel 13 of the same general type as the cargo elevator. However, this elevator preferably has a passenger cage 21 and a roof 22 to shield the passengers. The platform is adapted to be raised to about the floor level of the fuselage so that the passengers can walk across a gang plank 23 into the side door of the fuselage (not shown). When this elevator is lowered the roof covers the well and preserves the continuity of the field. Both of the elevators preferably have the ordinary cage extensions below their platforms to help guide them and also to close the passageways.

Now referring to the illustrated means for raising the tail of the plane, there is shown a plunger 24 of the same type as the elevator plungers. At a fixed distance to the rear of the cargo space, there is shown a flared or conical plunger guide or depression 25 in the bottom of the fuselage. The arrangement is such that the plunger, when it rises, will spot the fuselage perfectly both fore and aft and will also spot the tail laterally. Thus, the plane is practically anchored in the exact spotted position.

In some instances, it may be desirable to employ an ordinary lift truck on the field to lift and spot the tail of the plane. For this purpose, there is shown a bracket 26 having a downward projection 27 adapted to engage a recess or hole in the lift truck platform (not shown).

Both of the elevators and the plunger may be controlled by an attendant from a common control box 28 accessible through a covered opening 29 in the roof of the cargo tunnel. It will be understood that ordinary valves will be arranged in the control box in case the plungers are hydraulically or pneumatically driven. It is unnecessary to show the piping and the valves or the source of supply of the fluid, it being understood that automatic electric or other pumps may be used for a complete installation.

In the description of the apparatus, the loading operations were fully explained. It will, of course, be understood that the unloading operations also require that the planes be spotted. The procedure is the reverse of that for loading. On landing fields where the traffic is heavy there may be as many such loading and unloading stations as the width of the field will permit. The main tunnel 11 will be sufficiently wide to take care of passengers and cargo traffic. The latter will be handled by commercial lift trucks or other suitable vehicles.

From the foregoing description, it will be seen that I have provided improved facilities and mechanism for expeditiously loading and unloading planes without any danger of accidents during the transfer to and from the depot of the landing field. Also, this invention provides a means to keep the field clear of all vehicles and unauthorized persons so that pilots can be assured of ample landing space.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In a landing field, a subway for passengers and cargo; means to spot a plane above the subway; means to transfer the passengers and cargo from the subway to the fuselage of the plane; and means to engage the rear end of the plane and hold it in spotted position while the load is being transferred.

2. In a landing field, a cargo subway; and an elevator for transferring the cargo from the subway directly into a plane above and adapted to be lowered below the surface of the ground so as not to interfere with traffic.

3. In a landing field, an underground subway; guiding means on the ground for spotting a plane above the subway; and means to transfer passengers from the subway above the ground level adjacent to the fuselage of the plane.

4. In a landing field, a main subway; guiding means to engage the landing wheels of a plane above the subway; an elevator for transferring freight containers from the subway directly to the fuselage; and a passenger elevator to transfer passengers from the subway above the ground level adjacent to a passenger compartment in the fuselage.

5. In a landing field, an elevator adapted to be hoisted to the level of an airplane fuselage; means cooperating with the landing gear to spot the plane with reference to the elevator platform; and means to support the fuselage in loading position.

6. In a landing field, an elevator adapted to be hoisted above the ground to the level of an airplane fuselage so that the load may be transferred thereto and to be lowered below the ground level so that it will not interfere with plane traffic; guiding means adjacent to the elevator to spot a plane in loading position; and separate means to hold the plane in spotted position.

7. In a landing field, a pair of elevators, one to deposit cargo containers directly into an open bottomed fuselage, and the other to lift passengers, baggage and the like to a level with a door at one side thereof; guiding means on the field for the landing wheels of the plane; and mechanical lifting means co-operating with the tail portion of the plane to lift the fuselage to a substantially level position as well as to spot the plane with reference to the elevators.

8. In a landing field, a pair of elevators, one to deposit cargo containers directly into an open bottomed fuselage, and the other to lift passengers, baggage and the like to a level with a door at one side thereof; a grooved or trough-shaped guiding member on the field for a landing wheel of the plane; and an elevating plunger co-operating with the tail portion of the plane to lift the fuselage to a substantially level position as well as to spot the plane with reference to the elevators.

9. In a landing field, a main subway for both passengers and cargo leading to the loading stations; a pair of spaced lateral tunnels under a station; elevators in said lateral tunnels to lift passengers and cargo to proper loading positions; and means to spot an airplane correctly with respect to the elevators.

10. In a landing field, a cargo subway under the field; a cargo elevator having a platform adapted to be lowered to the floor level of the subway and arranged to lift cargo containers to loading position; and a live skid on the elevator platform to permit the cargo to be shifted.

11. In a landing field for passenger and cargo planes; a subway; plunger-operated passenger and cargo elevators; means to spot a plane with reference to said elevators, including a lifting plunger; and control means for said elevators and said plunger accessible from the landing surface.

12. In a landing field, a cargo subway under the field; a cargo elevator in said subway having a platform adapted to be lowered to the floor of the subway and arranged to lift cargo containers to loaded position in the fuselage of a plane; and a wheeled skid supporting a cargo container on the elevator platform to permit automatic adjustment of the container as it enters the fuselage through the bottom thereof.

In testimony that I claim the foregoing as my own, I have hereto affixed my signature.

ABNER F. CALLISON.